United States Patent
Wong (10) Patent No.: US 7,869,155 B1
(45) Date of Patent: Jan. 11, 2011

(54) RAMP DETECTION DURING SERVO-WRITING OF A DISK FOR A DISK DRIVE

(75) Inventor: Sean S. Wong, San Gabriel, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/760,601

(22) Filed: Jun. 8, 2007

(51) Int. Cl.
*G11B 21/02* (2006.01)
(52) U.S. Cl. .................................................. 360/75
(58) Field of Classification Search ................ None
See application file for complete search history.

(56) References Cited

U.S. PATENT DOCUMENTS

| | | | |
|---|---|---|---|
| 5,384,675 A * | 1/1995 | Crawforth et al. ............. | 360/75 |
| 5,559,648 A * | 9/1996 | Hunter et al. ................. | 360/75 |
| 6,563,660 B1 * | 5/2003 | Hirano et al. ................. | 360/75 |
| 6,590,732 B2 * | 7/2003 | Kitagawa et al. ............. | 360/75 |
| 6,643,088 B1 * | 11/2003 | Kawachi ....................... | 360/75 |
| 6,721,121 B1 | 4/2004 | Schreck et al. | |
| 6,902,007 B1 * | 6/2005 | Orr et al. ..................... | 166/379 |
| 6,920,007 B2 * | 7/2005 | Tominaga et al. ............. | 360/75 |
| 7,019,932 B2 | 3/2006 | Hirano et al. | |
| 7,046,475 B2 * | 5/2006 | Hosokawa .................... | 360/75 |
| 7,088,533 B1 | 8/2006 | Shepherd et al. | |
| 7,391,586 B2 * | 6/2008 | Keast ........................... | 360/75 |
| 7,486,466 B2 | 2/2009 | Hara et al. | |
| 2005/0152060 A1 | 7/2005 | Gururangan et al. | |
| 2005/0280916 A1 | 12/2005 | Calfee et al. | |
| 2006/0005403 A1 | 1/2006 | Calfee et al. | |

OTHER PUBLICATIONS www.microesys.com/dataStorage/specifications.html.
http://www.microesys.com/pdf/pa2000.pdf, "PA 2000 High Performance Positioning System for Servotrack Writers", MicroE Systems, PA2000 Rev.S1, 2 pages.

\* cited by examiner

*Primary Examiner*—K. Wong (57) ABSTRACT

A servo writer to detect a ramp is disclosed. The servo writer includes a head positioner to position a head of an actuator arm of a head disk assembly relative to a disk and a controller to: control the head positioner to move the head of the actuator arm toward a ramp of the disk; determine a head positioner value generated by the head positioner to move the head; and detect the ramp when the head positioner value exceeds a predetermined threshold.

24 Claims, 6 Drawing Sheets

RAMP DETECTION DURING SERVO-WRITING OF A DISK FOR A DISK DRIVE

BACKGROUND OF THE INVENTION

1. Field of the Invention

The present invention relates to disk drives. More particularly, the present invention relates to ramp detection techniques employed during the servo-writing of a disk for a disk drive.

2. Description of the Related Art

Today, computing devices such as personal computers, personal digital assistants, cell-phones, etc., are routinely used at work, at home, and everywhere in-between. Computing devices advantageously enable the use of application specific software, file sharing, the creation of electronic documents, and electronic communication and commerce through the Internet and other computer networks. Typically, each computing device has a storage peripheral such as a disk drive.

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

Typically, a conventional hard disk drive includes a disk having a plurality of concentric tracks. Each surface of each disk conventionally contains a plurality of concentric data tracks angularly divided into a plurality of data sectors. In addition, special servo information may be provided on each disk to determine the position of the moveable transducer head.

The most popular form of servo is called "embedded servo" wherein the servo information is written in a plurality of servo sectors that are angularly spaced from one another and are interspersed between data sectors around each track of each disk. Each servo sector typically includes at least a track identification (TKID) field, a sector ID field having a sector ID number to identify the sector, and a group of servo bursts (e.g. an alternating pattern of magnetic transitions) which the servo control system of the disk drive samples to align the moveable transducer head with or relative to a particular track.

During manufacturing of a disk drive, servo sectors are typically written to a disk to define a plurality of evenly-spaced, concentric tracks. Servo writers are typically used to write the servo sectors to the disk during disk drive manufacturing. Servo writers often employ extremely accurate head positioning mechanics, such as laser interferometers or optical encoders, to ensure that the servo sectors are written at the proper radial location, typically, from the inner diameter of the disk to the outer diameter of the disk. In addition, extremely accurate clocking systems may be utilized in order to write the servo sectors in the proper circumferential locations on the disk. Alternatively, instead of utilizing a servo writer, disk drives may perform self servo-writing in which the disk drive itself writes the servo sectors to the disk.

As disk drive manufacturers have been forced to increase data capacity in disk drives to remain competitive, a greater number of tracks are required to be servo-written to each disk to provide for the increased data storage capacity. To accomplish this, the distance between each of the servo-written tracks has become increasingly smaller. Unfortunately, due to the smaller distance between tracks, servo control margins have likewise become increasingly smaller resulting in increased servo control errors and disk drive failures in both testing and normal operations.

Currently, during the servo-writing of tracks to a disk, a nominal pre-determined stroke is typically used to write the servo pattern across the disk. The nominal stroke is usually pre-determined for a class of disk drives in order to prevent the writing of servo sectors to close to the ramp of the disk drive. Unfortunately, by utilizing a pre-determined nominal stroke, the full area of each particular disk is not utilized for writing servo sectors and defining the tracks of the disk drive.

SUMMARY OF THE INVENTION

In one embodiment of the invention, a servo writer to detect a ramp is disclosed. The servo writer includes a head positioner to position a head of an actuator arm of a head disk assembly relative to a disk and a controller to: control the head positioner to move the head of the actuator arm toward the ramp near the disk; determine a head positioner value generated by the head positioner to move the head; and detect a ramp when the head positioner value exceeds a predetermined threshold.

In another embodiment of the invention, a method to detect a ramp is disclosed. The method comprises: controlling movement of a head of an actuator arm of a head disk assembly relative to a disk toward a ramp near the disk with a head positioner; determining a value of the head positioner to move the head; and detecting a ramp when the head positioner value exceeds a predetermined threshold.

In even a further embodiment of the invention, a system to detect a ramp is disclosed. The system comprises: a head of an actuator arm of a head disk assembly; means for controlling movement of the head relative to a disk toward a ramp with a head positioner; means for determining a value generated by the head positioner to move the head; and means for detecting a ramp when the head positioner value exceeds a predetermined threshold.

The foregoing and other features of the invention are described in detail below and are set forth in the appended claims.

DETAILED DESCRIPTION

Figure 1:
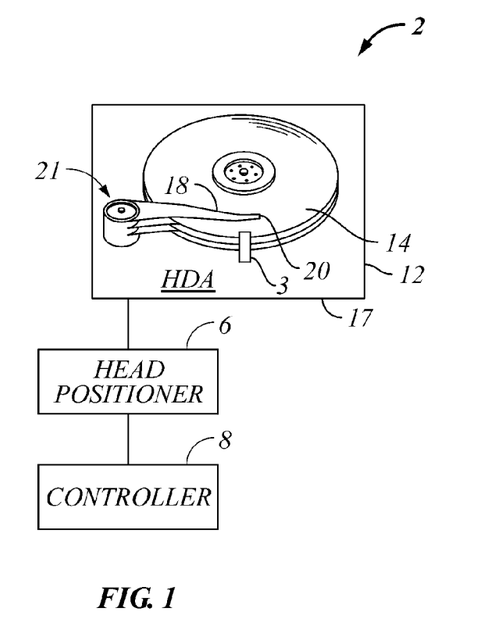
FIG. 1 is a block diagram illustrating an example of a servo track writer (STW) to detect a ramp of a disk drive prior to servo-writing, according to one embodiment of the invention.

FIG. 1 is a block diagram illustrating an example of a servo track writer (STW) 2 to detect a ramp 3 of a disk drive 12 prior to servo-writing, according to one embodiment of the invention. STW 2 may be employed to write servo sectors and other servo information to one or more disks 14 of a head disk assembly (HDA) 17 of a disk drive 12. Alternatively, in some embodiments, STW 2 may operate only upon an HDA. It should be appreciated that this is a very simplified illustration of an HDA, and many components are not shown and are not discussed, in order not to obscure the embodiments of the invention. Further, hereinafter, servo-writing will be discussed with reference to disk 14, however, it will be appreciated by those with skill in the art that one or more disks 14 may be simultaneously or serially written to.

Disk drive 12 may comprise HDA 17 that includes a disk 14, an actuator arm 18, a head 20 coupled to the distal end of actuator arm 18, and a voice coil motor (VCM) 21 for rotating actuator arm 18 about a pivot to position head 20 radially over disk 14. In this example, a ramp 3 may be utilized for the purpose of loading and unloading head 20 to and from disk 14, respectively.

Further, according to embodiments of the invention, STW 2 may include a head positioner 6 to position head 20 of actuator arm 18 of HDA 17 radially relative to disk 14. Additionally, STW 2 includes a controller 8 coupled to head positioner 6 to control head positioner 6 in order to control the movement of head 20 of actuator arm 18 toward ramp 3 at the outer diameter (OD) of disk 14. Controller 8 may generally control head positioner 6 to move head 20 of actuator arm 18 radially across disk 14.

Controller 8 may also be used to determine a head positioner value that is generated by head positioner 6 in order to move head 20. Based upon the head positioner value, controller 8 detects ramp 3 when the head positioner value exceeds a predetermined threshold. Thus, as head 20 is moved toward the OD, when controller 8 receives a head positioner value from head positioner 6 that exceeds a pre-determined threshold, controller 8 will detect ramp 3 and will determine the ramp's position. In an alternative embodiment, the ramp 3 may be located and detected at the inner diameter (ID) of the disk 14.

As will be described, in one embodiment, a separate STW is utilized in conjunction with a disk drive to write servo sectors to a disk and the STW includes a controller that detects an integrator value of a head positioner current generated by the head positioner of the STW, and if the integrator value of the head positioner current (which may correspond to the amount of force applied by the head positioner to the actuator arm) exceeds a predetermined threshold, then the ramp is detected.

In another embodiment, as will be described, a disk drive performs self servo-writing, and functions as its own STW. In this case, the head positioner value corresponds to a back electromotive force (EMF) received from the VCM 21 (functioning as the head positioner of the disk drive). When the back EMF exceeds a predetermined threshold, the ramp is detected. This functionality may be performed under the control of the disk controller.

Figure 2:
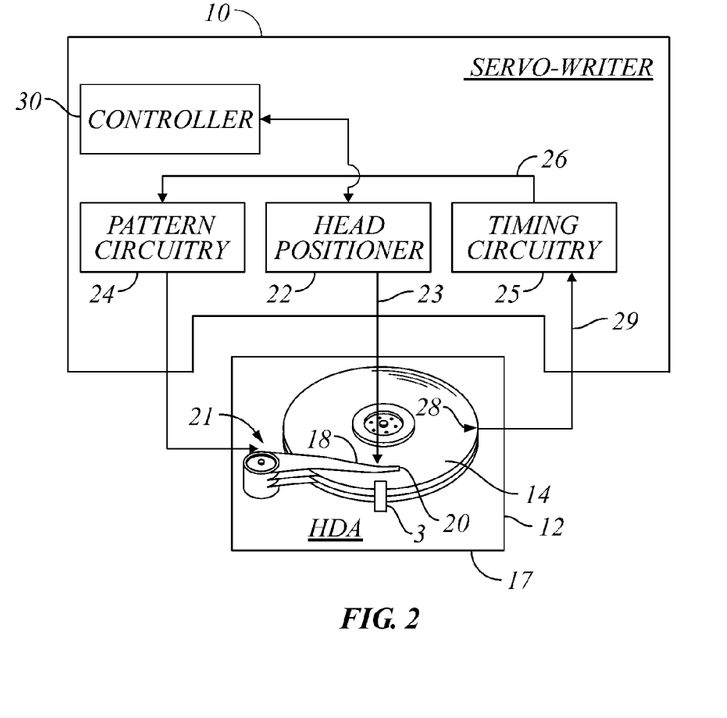
FIG. 2 is a block diagram illustrating an example of a separate STW that may be coupled to a disk drive or simply an HDA of a disk drive in order to detect a ramp and write servo sectors to the disk, according to one embodiment of the invention.

FIG. 2 is a block diagram illustrating an example of a separate STW 10 that may be coupled to a disk drive or simply an HDA of a disk drive in order to detect a ramp and write servo sectors to the disk, according to one embodiment of the invention.

In this embodiment, STW 10 may employ a write clock that is synchronized to the rotation of disk 14 such that a plurality of servo sectors may be written onto disk 14 at predetermined radial locations, in accordance with standard STW functionality. In this embodiment, STW 10 comprises a head positioner 22 for actuating a head positioning pin 23 using position measurement circuitry, such as a laser interferometer or an optical encoder. Pattern circuitry 24 generates a data sequence written to disk 14 for the servo sectors. In one embodiment, head positioner 22 may be a PA-2000 MICRO POSITIONER manufactured by MicroE Systems®.

An optical or magnetic clock head 28 may be used to read an optical or magnetic clock to generate a clock signal 29 processed by timing circuitry 25 to synchronize a write clock signal 26 so that servo sectors are written at appropriate positions on disk 14. This optical or magnetic clock track may be formed at the outside radius of at least one disk, or it may also be formed at the inside radius of at least one disk, or it may be formed or written on some other rotating member of the disk drive such as the spindle motor, hub, or disk attachment clamp. STW 10 under the control of control processor 30 (hereinafter controller 30) controls HDA 17 such that the actuator arm 18 is rotated to position head 20 radially over disk 14 in order to write servo sectors onto disk 14 based upon the output clock signal 26 that had been processed by timing circuitry 25. In this way, a predetermined sequence of servo sectors may be servo-written to disk 14.

It should be appreciated that STW 10 may be utilized with a complete disk drive or just an HDA of a disk drive. It should further be appreciated that many other types of servo track writers (STWs) may be utilized with embodiments of the invention. For example, an external STW may be utilized in an external media writing environment such as a clean room. In an external media writing environment, multiple disks may be servo-written without having to be located in the HDA of a disk drive or within a disk drive itself.

In one embodiment, under the control of controller 30 and based upon write clock signal 26, head positioner 22 via pin 23 positions head 20 relative to disk 14 such that head 20 writes servo sectors onto disk 14 from either the inner diameter (ID) to the outer diameter (OD) of disk 14 or from the OD to the ID of disk 14.

Figure 3:
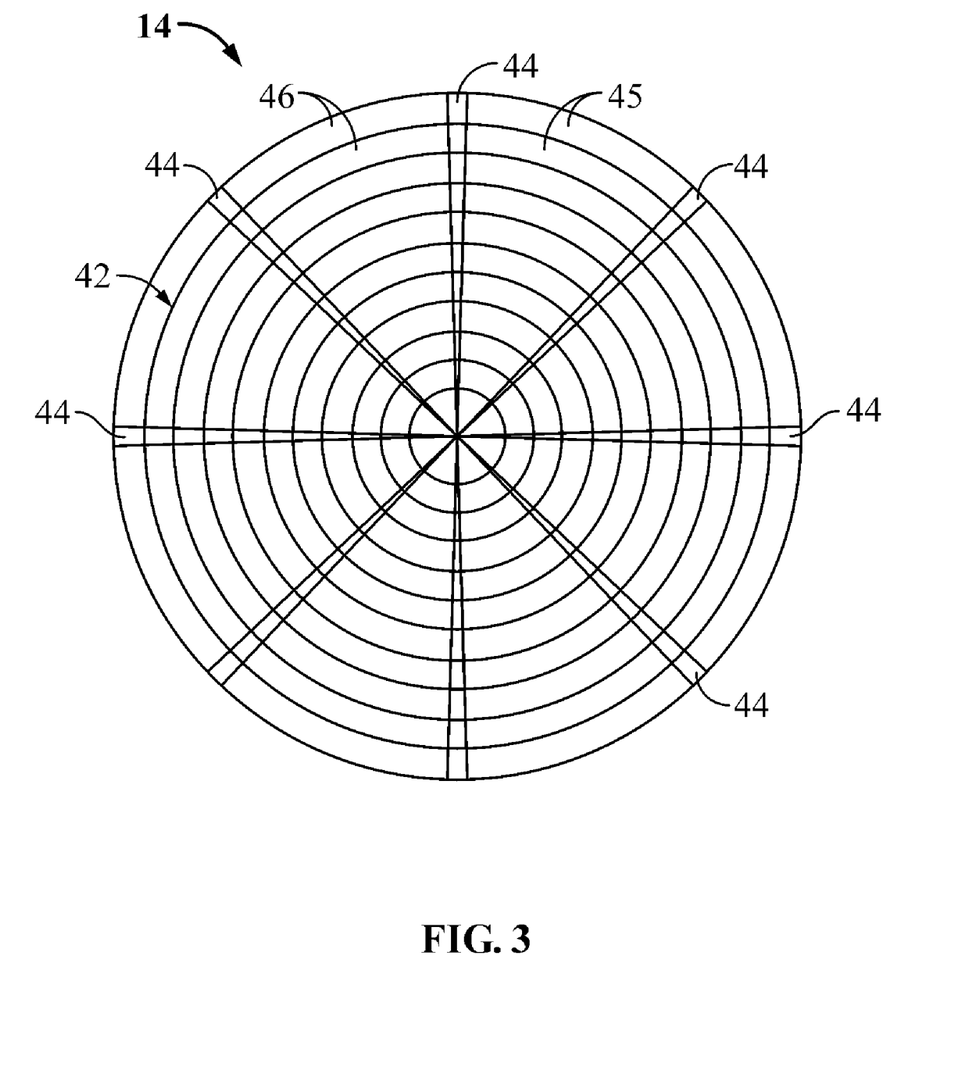
FIG. 3 is a diagram of a disk that illustrates servo sectors written onto a disk.

FIG. 3 is a diagram of a disk 14 that illustrates servo sectors 44 written onto disk 14. As is known, when manufacturing a disk drive, servo sectors 44 may be written to disk 14 in order to define a plurality of evenly-spaced, concentric tracks 45.

As an example, each servo sector 44 may include a phase lock loop (PLL) field, a servo synch mark (SSM) field, a track identification (TKID) field, a sector ID, and a group of servo bursts (e.g., an alternating pattern of magnetic transitions) that the servo system of the disk drive samples to align the moveable transducer head with and relative to, a particular track 45. Each circumferential track 45 includes a plurality of embedded servo sectors 44 utilized in seeking and track following. The plurality of servo sectors 44 are spaced sequentially around the circumference of a circumferential track 45 and extend radially outward from the inner diameter of disk 14. These embedded servo sectors 44 contain servo information utilized in seeking and track following and are interspersed between data regions 46 of disk 14. Data is conventionally written in the data regions 46 in a plurality of discrete data sectors. Each data region 46 is typically preceded by a servo sector 44.

Returning to FIG. 2, in one embodiment, head positioner 22 uses push pin 23 to position head 20 of actuator arm 18 of HDA 17 relative to disk 14. Before servo-writing, controller 30 controls head positioner 22 to move head 20 of actuator arm 18 toward ramp 3 of the outer diameter (OD) of disk 14. Controller 30 receives a head positioner value back from the head positioner 22 that corresponds to the amount of current used by the head positioner 22 to move the actuator arm 18 and head 20 from head positioner 22. When this value exceeds a predetermined threshold controller 30 detects ramp 3. Controller 30 may then calculate the ramp's position. Based upon the ramp's position, controller 30 can calculate a customized servo stroke for the particular disk drive.

This customized servo stroke is typically longer than the predetermined nominal servo stroke for the disk drive allowing the STW 10 to write servo sectors at greater radial distances from another such that the distance between tracks is increased.

In one embodiment, controller 30 determines an integrator value of the head positioner current received back from head positioner 22. Controller 30 may detect ramp 3 by determining that the integrator value of the head positioner current exceeds a predetermined threshold.

In one embodiment, controller 30 controls head positioner 22 such that head 20 is moved toward ramp 3 at the OD of disk 14 in a dithered manner (e.g., back and forth). It should be appreciated that the integrator value of the head positioner current corresponds to the amount of force applied by the head positioner pin 23 to actuator arm 18. Thus, the integrator current may be representative of the mechanical impedance between actuator arm 18 and pin 23.

In one embodiment, as will be described in more detail later, the predetermined threshold may be exceeded by determining at least two successively increasing maximum integrator values of the head positioner current.

After controller 30 has detected ramp 3, controller 30 determines the position of detected ramp 3. Controller 30 may then use the position to calculate a customized servo stroke for the HDA 17 for that particular disk drive 12 between an inner diameter of disk 14 and the position of the detected ramp 3. Based upon these values, controller 30 can determine a track spacing for the plurality of tracks to be servo-written to disk 14 by STW 10 based upon the radial distance of the determined customized servo write stroke. Thus, controller 30 of STW 10 may command the writing of servo sectors to disk 14 to define the plurality of tracks based upon a new calculated track spacing and the customized servo write stroke.

In this way, STW 10 is able to implement a customized servo stroke (that is typically longer or "stretched") for each individual disk drive such that either track spacing between tracks can be increased (reducing "track squeeze" problems) or more tracks can be written to the disk itself.

It should be appreciated that for disk drives having multiple disks, heads, and ramps that the customized servo write stroke length may be limited by the head-ramp combination at which a head is first lifted up by the associated ramp. The customized servo write stroke length may therefore be limited by the shortest customized servo write stroke length of the head-ramp combinations.

Figure 4:
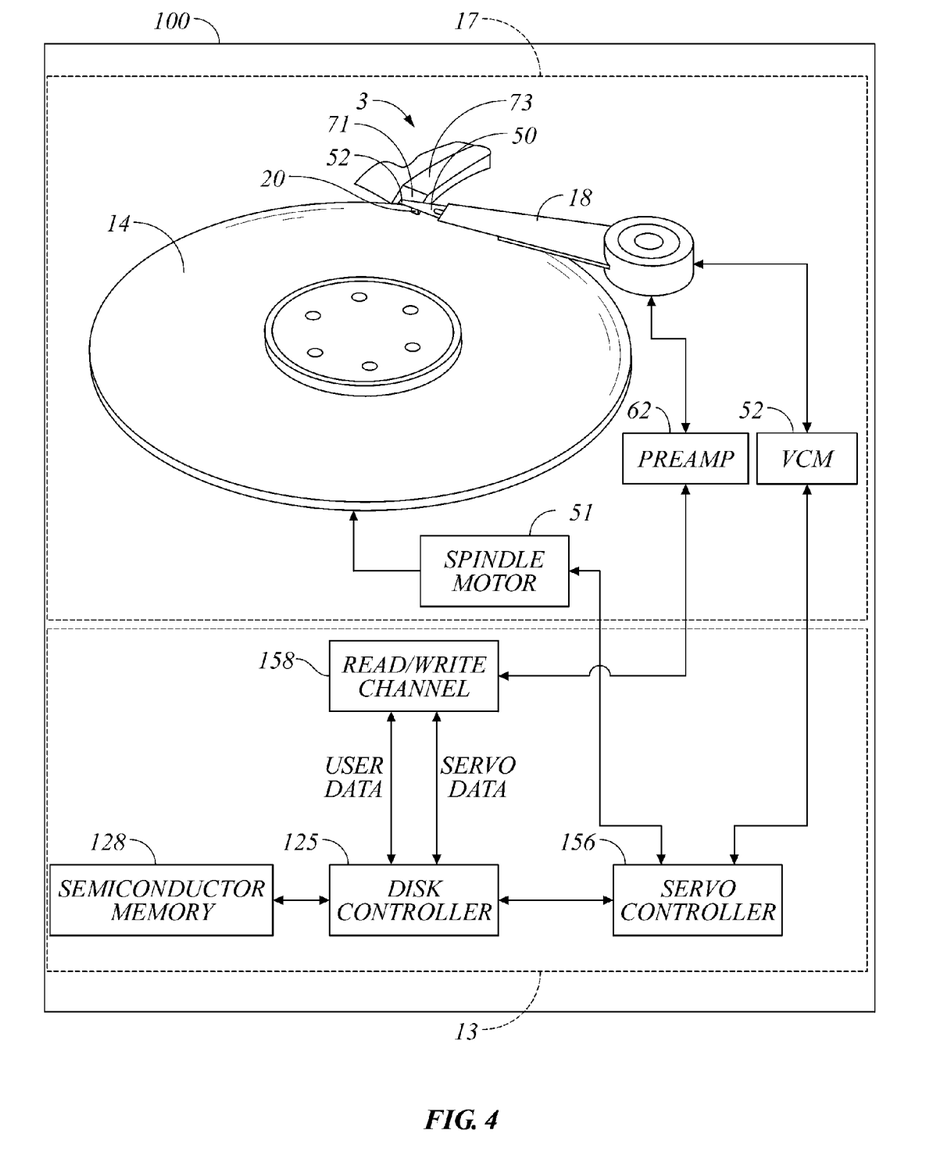
FIG. 4 is a block diagram illustrating a disk drive that performs self servo-writing and detects a ramp prior to servo-writing, according to one embodiment of the invention.

FIG. 4 is a block diagram illustrating a disk drive 100 that performs self servo-writing and detects a ramp prior to servo-writing, according to one embodiment of the invention.

Self servo-writing disk drive 100 includes HDA 17 and a printed circuit board (PCB) 13 that includes much of the electronics of disk drive 100. In particular, disk drive 100 includes HDA 17 having one or more disks 14 and transducer head 20 that is actuated radially over the disk, as previously described.

Disk drive 100 further includes a disk controller 125. Disk controller 125 responds to disk drive commands and accesses data storage locations on disk 14 through transducer head 20. Disk controller 125 may connect disk drive 12 to a host computer (not shown) via a suitable connector and cable.

HDA 17 of disk drive 12 further includes a spindle motor 51 for rotating disk 14 and a voice coil motor (VCM) 52 for actuating transducer head 20 radially over disk 14. Servo controller 156 generates appropriate control signals applied to the spindle motor 51 and a head positioner, such as VCM 52, in response to commands received from disk controller 125.

During a write operation, disk controller 125 transmits user data received from a host to a read/write channel 158. The read/write channel 158 performs appropriate encoding of user data to generate write data that may be written to disk 14. The write data modulates the operation of preamp 62 to generate a write signal applied to head 20 in order to write magnetic transitions onto the surface of disk 14. During a read operation, head 20 detects magnetic transitions representing recorded data to generate a read signal which is amplified by preamp 62 to generate a read signal applied to read/write channel 158. Read/write channel 158 demodulates the read signal into user data transmitted to, for example, a host computer via disk controller 125.

Disk 14, spindle motor 51, VCM 52, preamp 62, and related hardware may be integrated into HDA 17. Disk controller 125, semiconductor memory 128, servo controller 156, read/write channel 158 and related electronics may be mounted on PCB 13. Disk controller 125 generally includes circuitry and processors that control HDA 17 and provides an intelligent control interface between a host computer and HDA 17 for execution of disk-drive commands. Disk controller 125 may have an internal microprocessor and non-volatile memory. Semiconductor memory 128 may also have non-volatile memory and volatile random access memory (RAM).

In one embodiment, disk drive 100 may be a self-servo writing disk drive. However, before beginning to self servo-write, disk drive 100 may calculate a customized servo write stroke for HDA 17 between the inner diameter (ID) of disk 14 and the position of a detected ramp 3. In particular, disk controller 125, through servo controller 156, may cause head 20 to be moved towards ramp 3 at the outer diameter (OD) of disk 14 and disk controller 125 may measure the back electromotive force (EMF) received from VCM 52. When the back EMF exceeds a predetermined threshold, disk controller 125 detects that ramp 3 has been located. In one embodiment, the disk controller 125 may cause the head 20 to be moved towards the ramp 3 in a dithered manner. The disk controller 125 may detect ramp 3 when the back EMF falls below a predetermined threshold for two successive measurements, due to the ramp 3 providing resistance to the movement of the actuator arm 18.

Based upon the position of detected ramp 3, disk controller 125 may calculate a customized servo write stroke for HDA 17 between the ID of disk 14 and the position of the detected ramp 3. Further, based upon the calculated customized servo write stroke, disk controller 125 may further determine a new track spacing for the plurality of tracks to be servo-written to disk 14. Disk controller 125 may then command the writing of servo sectors to disk 14 to define the plurality of tracks based upon the new track spacing and customized servo write stroke, as previously discussed with reference to the separate STW embodiment 10.

As particularly shown in FIG. 4, actuator arm 18 includes a head gimbal assembly (HGA) 50 to which head 20 is attached and a lift tab 52 that rides up upon an angled portion 71 of ramp 3. When the disk drive is powered down, lift tab 52 will ride up angled portion 71 and may then be loaded safely onto planar portion 73 of ramp 3 for storage.

Ramp 3 may be detected, as previously described, when either the back EMF (self-servo writing disk drive embodiment 100) or the integrator value of the head positioner current (separate STW embodiment 10) exceed a predetermined threshold indicating that lift tab 52 has come into contact with the angled portion 71 of ramp 3. It should be appreciated that this is only one example of a ramp configuration and that many other types of ramps may be utilized with the embodiments disclosed herein.

For the purposes of the present specification, it should be appreciated that the terms "processor", "microprocessor", and "controller", etc., refer to any machine or collection of logic that is capable of executing a sequence of instructions and shall be taken to include, but not be limited to, general purpose microprocessors, special purpose microprocessors, central processing units (CPUs), digital signal processors (DSPs), application specific integrated circuits (ASICs), multi-media controllers, signal processors and microcontrollers, etc.

It should be appreciated that previously-described controllers, processors, microprocessors, etc., may operate under the control of a program to implement aspects of the various embodiments of the invention. Components of the various embodiments of the invention may be implemented as hardware, software, firmware, microcode, or any combination thereof. When implemented in software, firmware, or microcode, the elements of the embodiment of the present invention are the program code or code segments that include instructions to perform the necessary tasks. A code segment may represent a process, procedure, a function, a subprogram, a program, a routine, a subroutine, a module, a software package, a class, or any combination of instructions, data structures, or program statements.

The program or code segments may be stored in a processor readable medium or transmitted by a data signal embodied in a carrier wave, or a signal modulated by a carrier, over a transmission medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor circuitry to perform the operations described herein. The term "data" herein refers to any type of information that is encoded for machine-readable purposes. Therefore, it may include programs, code, data, files, etc.

Figure 5:
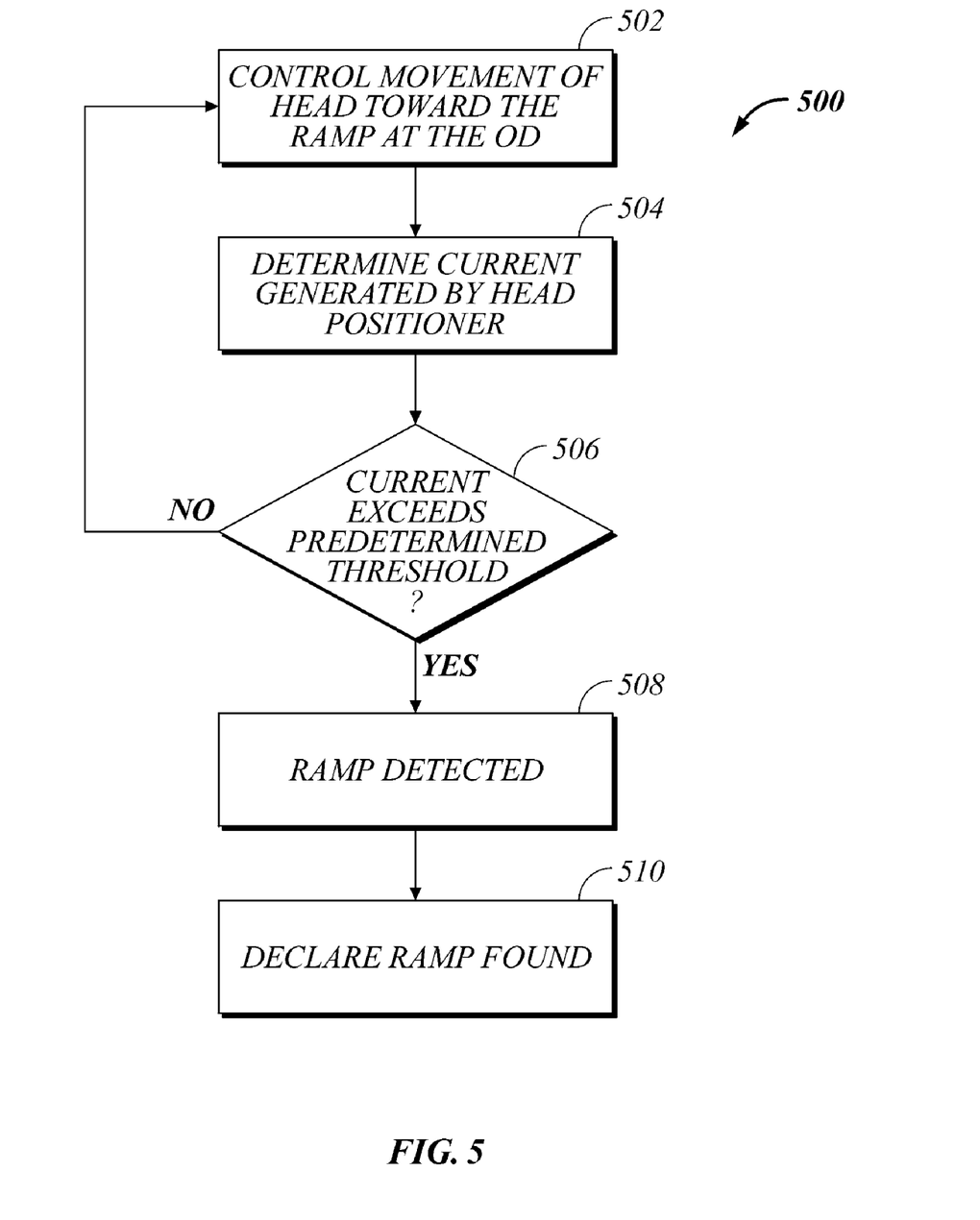
FIG. 5 is a flow diagram illustrating a process implemented by a STW to detect a ramp, according to one embodiment of the invention.

FIG. 5 is a flow diagram illustrating a process 500 implemented by STW 10 to detect a ramp, according to one embodiment of the invention. At block 502, the head of the actuator arm of the HDA is moved towards the ramp at the outer diameter (OD) of the disk. In one embodiment, the head is moved towards the ramp in a dithered manner. At block 504, the controller determines the amount of current generated by the head positioner to move the head. At block 506, the controller determines whether the value of the current exceeds a predetermined threshold. In one embodiment the integrator value of the current is utilized. If the current does not exceed the predetermined threshold, process 500 moves back to block 502, wherein the head continues to be moved towards the ramp at the OD. However, if at block 506 it is determined that the value of the current exceeds the predetermined threshold, then at block 508, the controller detects the ramp, and at block 510, the controller may declare that the ramp has been found.

Figure 6:
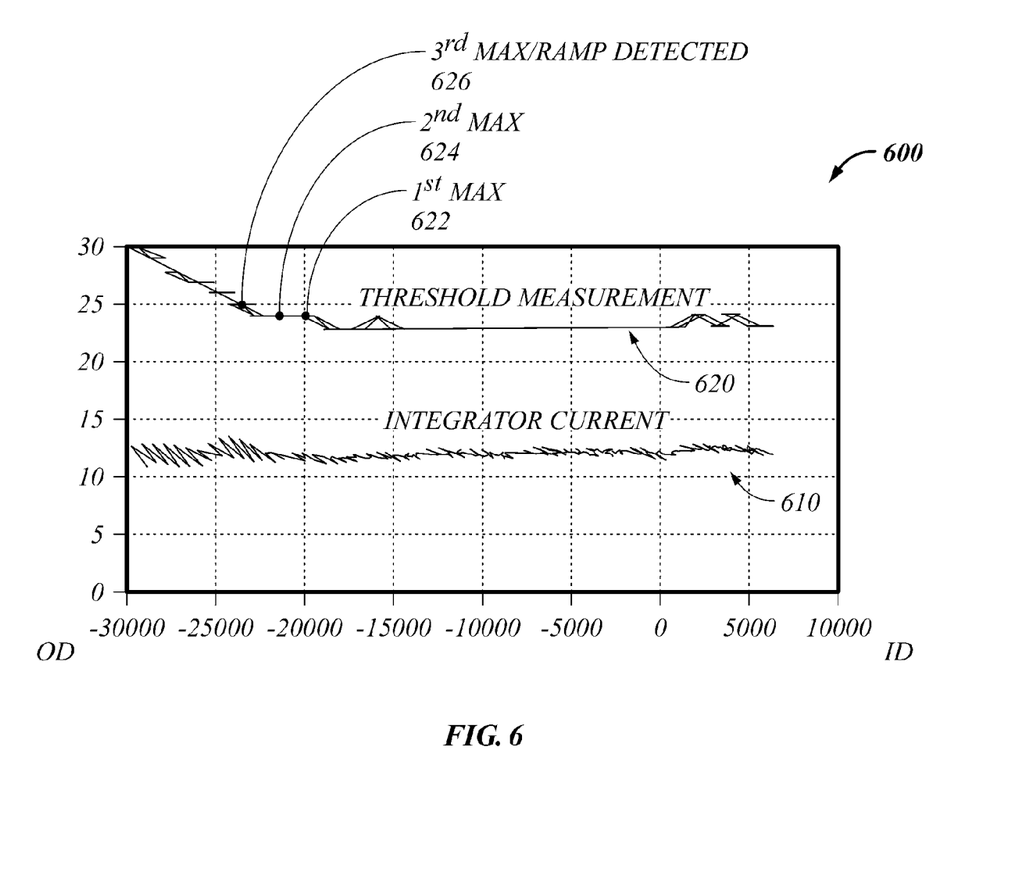
FIG. 6 is a graph illustrating the integrator value of the head positioner current as the head is moved towards the outer diameter (OD).

FIG. 6 is a graph 600 illustrating the integrator value of the head positioner current (hereinafter integrator current) as the head is moved towards the outer diameter (OD). Line 610 illustrates the dithered integrator current as the head is moved from the ID to the OD. The x-axis represents the track numbers from ID to OD and the y-axis is representative of normalized values for the integrator current.

Line 620 located above line 610 illustrates a threshold measurement formula that is correlated to the integrator current to determine whether a ramp has been detected. For example, in one embodiment, the threshold measurement formula may be proportional to the difference between the sum of the maximum integrator current values and the sum of the minimum integrator current values. In one embodiment, the predetermined threshold is found to be exceeded by determining at least two successively increasing maximum integrator values of the head positioner integrator current.

As can be seen in FIG. 6, the head positioner integrator current stays within a normal bounded range up to approximately a first maximum point denoted first max 622. A second maximum is then measured at point 624. However, this second maximum 624 is roughly equivalent to the first maximum 622.

But then, at point 626, a third maximum is detected that is greater than the first or second maximum, and based upon this, the ramp is detected.

It should be appreciated that a wide variety of formulas to measure thresholds for the integrator current may be utilized, however, the previously-described methodology in which at least two successive increasing maximum integrator values of head positioner current are determined can be used to accurately reflect the HGA or lift tab abutting the ramp. It should also be noted that the integrator value of the head positioner current (i.e., integrator current) corresponds to the amount of force applied by the head positioner to the actuator arm and is representative of the mechanical impedance of the head positioner pin against the actuator arm. It follows that when the integrator value of the head positioner current increases substantially, it may be due to a resistance, such as the ramp.

Further, in the case of the self servo-writing disk drive, when a back EMF received from the VCM exceeds a certain predetermined threshold, this likewise indicates the detection of a resistance, such as a ramp, and based upon this, the position of the detected ramp may be calculated.

Figure 7:
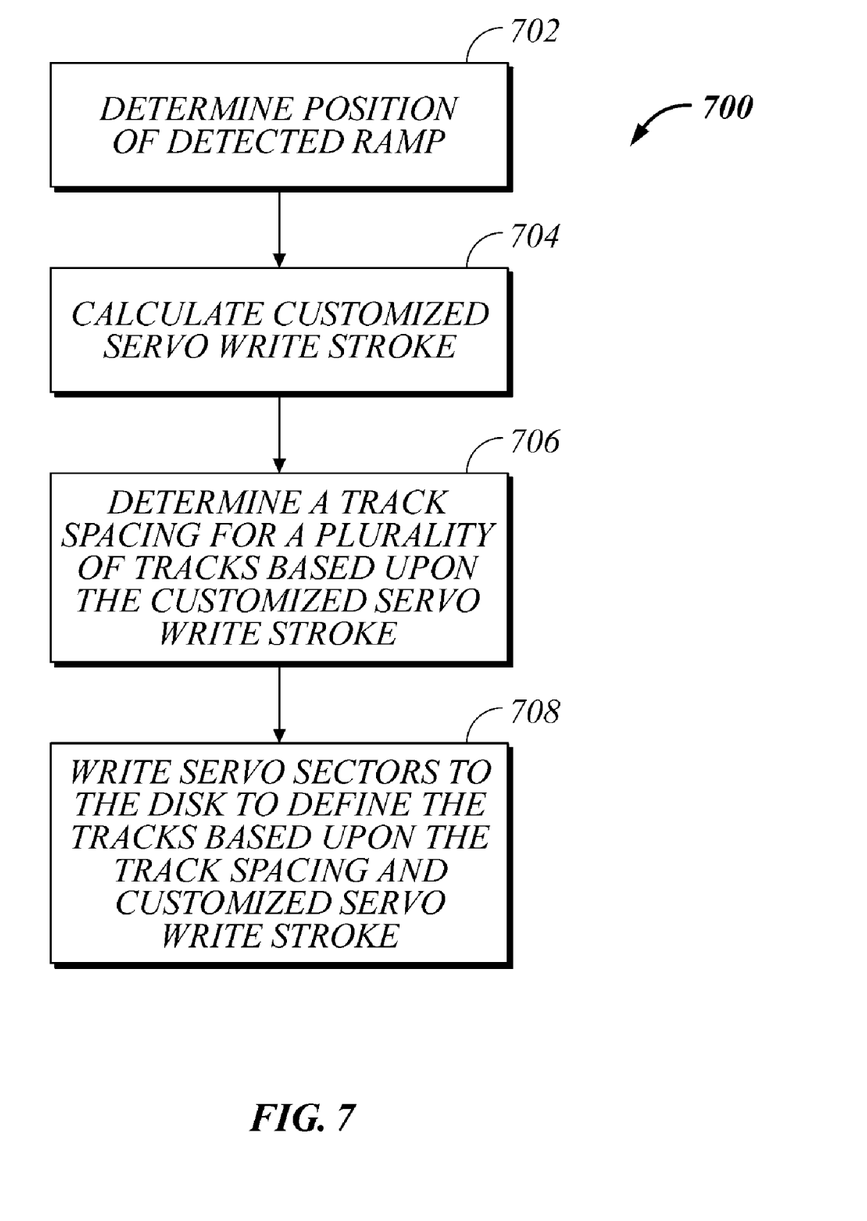
FIG. 7 illustrates a flow diagram illustrating a process to write servo sectors to a disk based upon a customized servo write stroke.

FIG. 7 illustrates a flow diagram illustrating a process 700 to write servo sectors to a disk based upon a customized servo write stroke. These techniques may be utilized with either the separate STW or self-servo writing disk drive previously described. At block 702, the position of the detected ramp is determined. Next, a customized servo write stroke is calculated (block 704). At block 706, a track spacing for a plurality of tracks based upon the customized servo write stroke is determined. Lastly, servo sectors are written to the disk to define the tracks based upon the track spacing and customized servo write stroke (block 708).

Utilizing the previously-described techniques, greater track spacing between tracks may be provided on a disk resulting in reduced track squeeze and servo control errors both during testing and operation. Alternatively, utilizing these techniques, the disk space may be more effectively utilized to write more tracks to the disk.

The techniques previously described can be employed for disk drives with embedded servo systems. However, numerous alternatives for disk drives with similar or other media format characteristics can be employed by those skilled in the art to use the invention with equal advantage to implement these techniques. Further, although the embodiments have been described in the context of a disk drive with embedded servo sectors, the invention can be employed in many different types of disk drives having a head actuator that scans the media. For example, these techniques could be used with stamped media that includes servo information pre-written on the disk. The techniques disclosed herein could be used to detect the location of ramp 3 to avoid collisions with the ramp 3 at an undesirable velocity and/or to determine the maximum amount of available data tracks for the disk drive.

I claim:

1. A servo writer comprising:
   a head positioner to position a head of an actuator arm of a head disk assembly relative to a disk that does not have servo sectors written thereon; and
   a controller to:
      control the head positioner to move the head of the actuator arm toward a ramp near the disk;
      determine a head positioner value generated by the head positioner to move the head without reading position information on the disk;
      detect the ramp when the head positioner value exceeds a predetermined threshold; and
      write servo sectors to the disk based in part on the detected ramp.

2. The servo writer of claim 1, wherein the head positioner value is a back electromotive force (EMF) received from a voice coil motor.

3. The servo writer of claim 1, wherein the controller controls the head positioner to move the head toward the ramp in a dithered manner.

4. The servo writer of claim 3, wherein the head positioner value is a head positioner current and wherein an integrator value of the head positioner current is determined, the integrator value of the head positioner current corresponding to the amount of force applied by the head positioner to the actuator arm.

5. The servo writer of claim 4, wherein the predetermined threshold is exceeded by determining at least two successively increasing maximum integrator values of the head positioner current.

6. The servo writer of claim 1, wherein the controller determines a position of the detected ramp.

7. The servo writer of claim 6, wherein the controller, based upon the position of the detected ramp, calculates a customized servo write stroke for the head disk assembly between an inner diameter (ID) of the disk and the position of the detected ramp.

8. The servo writer of claim 7, wherein the controller is further to:
   determine a track spacing for a plurality of tracks to be written to the disk based upon the customized servo write stroke; and
   command the writing of servo sectors to the disk to define the plurality of tracks based upon the track spacing and the customized servo write stroke.

9. A method for detecting a ramp comprising:
   controlling movement of a head of an actuator arm of a head disk assembly with a head positioner relative to a disk toward the ramp; wherein the disk does not have servo sectors written thereon;
   determining a value generated by the head positioner to move the head without reading position information on the disk;
   detecting the ramp when the head positioner value exceeds a predetermined threshold; and
   writing servo sectors to the disk based in part on the detected ramp.

10. The method of claim 9, wherein the value generated by the head positioner is a back electromotive force (EMF) from a voice coil motor.

11. The method of claim 9, further comprising controlling the movement of the head toward the ramp in a dithered manner.

12. The method of claim 11, wherein the head positioner value is a head positioner current, further comprising determining an integrator value of the head positioner current which corresponds to the amount of force applied by the head positioner to the actuator arm.

13. The method of claim 12, wherein the predetermined threshold is exceeded by determining at least two successively increasing maximum integrator values of the head positioner current.

14. The method of claim 9, further comprising determining a position of the detected ramp.

15. The method of claim 14, further comprising calculating a customized servo write stroke for the head disk assembly between an inner diameter (ID) of the disk and the position of the detected ramp.

16. The method of claim 15, further comprising:
   determining a track spacing for a plurality of tracks to be written to the disk based upon the customized servo write stroke; and
   commanding the writing of servo sectors to the disk to define the plurality of tracks based upon the track spacing and the customized servo write stroke.

17. A system to detect a ramp comprising:
   a head of an actuator arm of a head disk assembly;
   a means for controlling movement of the head relative to a disk toward the ramp with a head positioner, wherein the disk does not have servo sectors written thereon;
   means for determining a value generated by the head positioner to move the head without reading position information on the disk; and
   means for detecting the ramp when the head positioner value exceeds a predetermined threshold; and
   means for writing servo sectors to the disk based in part on the detected ramp.

18. The system of claim 17, wherein the head positioner value is a back electromotive force (EMF) received from a voice coil motor.

19. The system of claim 17, further comprising means for controlling the movement of the head toward the ramp in a dithered manner.

20. The system of claim 19, wherein the head positioner value is a head positioner current, further comprising means for determining an integrator value of the head positioner current which corresponds to the amount of force applied by the head positioner to the actuator arm.

21. The system of claim 20, wherein the predetermined threshold is exceeded by determining at least two successively increasing maximum integrator values of the head positioner current.

22. The system of claim 17, further comprising means for determining a position of the detected ramp.

23. The system of claim 21, further comprising means for calculating a customized servo write stroke for the head disk assembly between an inner diameter (ID) of the disk and the position of the detected ramp.

24. The system of claim 22, further comprising:

means for determining a track spacing for a plurality of tracks to be written to the disk based upon the customized servo write stroke; and means for commanding the writing of servo sectors to the disk to define the plurality of tracks based upon the track spacing and the customized servo write stroke.

* * * * *